United States Patent
Suzuki

(10) Patent No.: US 12,013,948 B2
(45) Date of Patent: Jun. 18, 2024

(54) PROCESSING DEVICE AND PROCESSING METHOD

(71) Applicant: Assured, Inc., Tokyo (JP)

(72) Inventor: Yasuhiro Suzuki, Tokyo (JP)

(73) Assignee: Assured, Inc., Tokyo (JP)

( * ) Notice: Subject to any disclaimer, the term of this patent is extended or adjusted under 35 U.S.C. 154(b) by 299 days.

(21) Appl. No.: 17/535,951

(22) Filed: Nov. 26, 2021

(65) Prior Publication Data

US 2022/0083670 A1    Mar. 17, 2022

Related U.S. Application Data

(63) Continuation of application No. PCT/JP2020/018232, filed on Apr. 30, 2020.

(30) Foreign Application Priority Data

May 28, 2019   (JP) .................. 2019-099506

(51) Int. Cl.
*G06F 21/00*   (2013.01)
*G06F 21/54*   (2013.01)
(Continued)

(52) U.S. Cl.
CPC ............ *G06F 21/577* (2013.01); *G06F 21/54* (2013.01); *G06F 21/554* (2013.01); *G06F 21/566* (2013.01)

(58) Field of Classification Search
CPC ...... G06F 21/577; G06F 21/54; G06F 21/554; G06F 21/566
See application file for complete search history.

(56) References Cited

U.S. PATENT DOCUMENTS 9,824,216 B1 * 11/2017 Khalid .................. G06F 21/554
10,084,811 B1 * 9/2018 Dinning .............. H04L 63/1433
(Continued)

FOREIGN PATENT DOCUMENTS

JP   2007-58514   3/2007
JP   2010-86311   4/2010
(Continued)

OTHER PUBLICATIONS

Yujiro Hayashi, et al; "Vulnerability Management Service-Future Vuls is Here", FutureVuls, Software Design, Jan. 2018, Dec. 18, 2017; with English translation; 12 pgs.
(Continued)

*Primary Examiner* — Don G Zhao
(74) *Attorney, Agent, or Firm* — Maier & Maier, PLLC

(57) ABSTRACT

A processing device that determines a vulnerability of open software in a system, the processing device comprising: a control unit that outputs priority of the vulnerability based on at least one of first information indicating whether the open software is externally accessible, and second information indicating whether an attack code for the vulnerability of the open software is in circulation, wherein the control unit assigns higher priority to the vulnerability of the open software externally accessible compared to the vulnerability of the open software externally inaccessible, or assigns higher priority to the vulnerability where the attack code is in circulation compared to the vulnerability where the attack code is not in circulation.

7 Claims, 7 Drawing Sheets

| TRIAGE LEVEL | FIRST CONDITION (FIRST INFORMATION) | SECOND CONDITION (SECOND INFORMATION) | THIRD CONDITION (THIRD INFORMATION) | FOURTH CONDITION (FOURTH INFORMATION) |
|---|---|---|---|---|
| LEVEL 1 | ○ | ○ | ○ | ○ |
| LEVEL 2 | — | ○ | ○ | ○ |
| LEVEL 3 | — | — | — | ○ |
| LEVEL 4 | — | — | — | — |

(51) Int. Cl.
  G06F 21/55 (2013.01)
  G06F 21/56 (2013.01)
  G06F 21/57 (2013.01)

(56) References Cited

U.S. PATENT DOCUMENTS

| | | | | |
|---|---|---|---|---|
| 10,305,925 | B2* | 5/2019 | Roytman | G06F 21/577 |
| 10,715,542 | B1* | 7/2020 | Wei | G06F 16/958 |
| 10,735,451 | B1* | 8/2020 | Baker | H04L 63/20 |
| 10,749,890 | B1* | 8/2020 | Aloisio | H04L 41/142 |
| 11,128,654 | B1* | 9/2021 | Joyce | G06F 16/955 |
| 11,356,466 | B2* | 6/2022 | Karin | G06N 20/00 |
| 2011/0314145 | A1* | 12/2011 | Raleigh | H04W 48/16 |
| | | | | 709/224 |
| 2012/0221955 | A1* | 8/2012 | Raleigh | H04M 15/58 |
| | | | | 726/1 |
| 2013/0074188 | A1* | 3/2013 | Giakouminakis | G06F 21/577 |
| | | | | 726/25 |
| 2014/0094159 | A1* | 4/2014 | Raleigh | H04W 24/02 |
| | | | | 455/418 |
| 2016/0344604 | A1* | 11/2016 | Raleigh | H04L 43/0876 |
| 2017/0026401 | A1* | 1/2017 | Polyakov | H04L 63/20 |
| 2017/0374082 | A1* | 12/2017 | Solow | H04L 63/20 |
| 2018/0176245 | A1* | 6/2018 | Cornell | G06F 21/577 |
| 2018/0276372 | A1* | 9/2018 | Crabtree | G06F 9/455 |
| 2018/0357422 | A1* | 12/2018 | Telang | G06F 21/577 |
| 2019/0005246 | A1* | 1/2019 | Cherny | G06F 21/577 |
| 2019/0052663 | A1* | 2/2019 | Lee | H04L 63/20 |
| 2019/0166137 | A1* | 5/2019 | Mendes | G06F 21/564 |
| 2019/0188342 | A1* | 6/2019 | Hershey | G06F 30/20 |
| 2019/0354913 | A1* | 11/2019 | Venkadesavaralu | |
| | | | | H04L 63/1433 |
| 2020/0012796 | A1* | 1/2020 | Trepagnier | G06F 18/254 |
| 2020/0034574 | A1* | 1/2020 | Baltes | H04W 4/50 |
| 2020/0057857 | A1* | 2/2020 | Roytman | G06N 7/01 |
| 2020/0092319 | A1* | 3/2020 | Spisak | G06N 7/01 |
| 2020/0120126 | A1* | 4/2020 | Ocepek | H04L 63/1433 |
| 2020/0287924 | A1* | 9/2020 | Zhang | G06F 16/288 |
| 2021/0264031 | A1* | 8/2021 | Dhillon | G06F 21/577 |
| 2021/0392153 | A1* | 12/2021 | Bubshait | H04L 63/1416 |
| 2023/0019180 | A1* | 1/2023 | de Nijs | G06F 21/577 |

FOREIGN PATENT DOCUMENTS

| | | |
|---|---|---|
| JP | 2012-208863 | 10/2012 |
| JP | 2016-149052 | 8/2016 |
| JP | 2017-16631 | 1/2017 |
| JP | 2018-77597 | 5/2018 |

OTHER PUBLICATIONS

"Overview of Common Vulnerability Assessment System CVSS"; Information Technology Promotion Agency; 1.; May 31, 2018; [retrieved on Aug. 29, 2019]; Internet: URL:https://www.ipa.go.jp/security/vuln/CVSS.html; 15 pgs.

Hidekazu Takahashi; "Black Duck Hub that Visualizes the Three Risks of Black Duck and Open Source"; ITPRO EXPO 2017; Oct. 13, 2017; [retrived on Aug. 29, 2019]; Internet: URL:https://tech.nikkeiibp.co.jp/it/atcl/column/17/101000415/101300112/; Nikkei Business Publications, Inc.; 9 pgs.

International Search Report issued on Jun. 30, 2020 in International Application No. PCT/JP2020/018232; 6 pgs.

* cited by examiner

Fig. 3

| VULNERABILITY | OSS | TYPE | DESCRIPTION | EFFECTS |
|---|---|---|---|---|
| xxx | SSS | AAA | aaa | ... |
| yyy | TTT | BBB | bbb | ... |
| ... | ... | ... | ... | ... |

Fig. 5

| TRIAGE LEVEL | FIRST CONDITION (FIRST INFORMATION) | SECOND CONDITION (SECOND INFORMATION) | THIRD CONDITION (THIRD INFORMATION) | FOURTH CONDITION (FOURTH INFORMATION) |
|---|---|---|---|---|
| LEVEL 1 | ○ | ○ | ○ | ○ |
| LEVEL 2 | - | ○ | ○ | ○ |
| LEVEL 3 | - | - | - | ○ |
| LEVEL 4 | - | - | - | - |

Fig. 6

| ID | TRIAGE LEVEL | STATUS | REPOSITORY | SOFTWARE | SCAN DATE |
|---|---|---|---|---|---|
| N | LEVEL 1 | UNADDRESSED | xxx | PPP | 2019/2/14 9:01 |
| N-1 | LEVEL 2 | UNADDRESSED | yyy | QQQ | 2019/2/14 9:01 |
| N-2 | LEVEL 3 | ADDRESSED | zzz | RRR | 2019/2/7 13:01 |
| ... | LEVEL 4 | UNADDRESSED | ... | ... | ... |

PROCESSING DEVICE AND PROCESSING METHOD

CROSS-REFERENCE TO RELATED APPLICATIONS

This application is a continuation of International Application No. PCT/JP2020/018232, filed on Apr. 30, 2020, which claims priority to Japanese Patent Application No. 2019-099506 filed May 28, 2019, and both of the aforementioned applications are hereby incorporated by reference in their entireties.

TECHNICAL FIELD

The present invention relates to a processing device and a processing method.

BACKGROUND ART

Techniques have been proposed for effectively selecting vulnerability information to be investigated among pieces of vulnerability information about software. Specifically, an information processing device may collect vulnerability information publicized in a network such as the Internet, and identify vulnerability information corresponding to the software. Based on information such as the attack type, the communication protocol, and the product type of the software, the information processing device may determine the priority of each piece of vulnerability information identified (e.g., Patent Literature 1).

CITATION LIST

Patent Literature

Patent Literature 1: Japanese Patent Laid-Open No. 2007-58514

SUMMARY OF INVENTION

A first feature is summarized as a processing device that determines a vulnerability of open software in a system, the processing device comprising: a control unit that outputs priority of the vulnerability based on at least one of first information indicating whether the open software is externally accessible, and second information indicating whether an attack code for the vulnerability of the open software is in circulation, wherein the control unit assigns higher priority to the vulnerability of the open software externally accessible compared to the vulnerability of the open software externally inaccessible, or assigns higher priority to the vulnerability where the attack code is in circulation compared to the vulnerability where the attack code is not in circulation.

A second feature according to the first feature is summarized as the processing device comprising: an output unit that outputs a user interface used to input whether the open software is externally accessible.

A third feature according to the second feature is summarized as the output unit outputs a user interface used to input whether the open software is externally accessible per system including the open software having the vulnerability.

A fourth feature according to any one of the first to the third features is summarized as the control unit outputs the priority of the vulnerability based on both the first information and the second information.

A fifth feature according to the fourth feature is summarized as the control unit outputs the priority of the vulnerability based on third information indicating a type of the vulnerability, in addition to the first information and the second information.

A sixth feature according to the fifth feature is summarized as the control unit outputs the priority of the vulnerability based on fourth information indicating a level of the vulnerability set by a third-party organization, in addition to the first information, the second information, and the third information.

A seventh feature according to the sixth feature is summarized as the control unit identifies a vulnerability having the level meets a level condition based on the fourth information, and the control unit outputs the priority of the vulnerability for identified vulnerability, based on the first information, the second information, and the third information.

An eighth feature according to any one of the fifth to the seventh feature is summarized as the control unit identifies a vulnerability where the attack code is in circulation based on the second information, or identifies a vulnerability having the type meets a type condition based on the third information, and the control unit outputs the priority of the vulnerability for identified vulnerability, based on the first information.

A ninth feature is summarized as a processing method for determining a vulnerability of open software in a system, the method including the steps of: outputting priority of the vulnerability based on at least one of first information indicating whether the open software is externally accessible, and second information indicating whether an attack code for the vulnerability of the open software is in circulation; and assigning higher priority to the vulnerability of the open software externally accessible compared to the vulnerability of the open software externally inaccessible, or assigns higher priority to the vulnerability where the attack code is in circulation compared to the vulnerability where the attack code is not in circulation.

BRIEF DESCRIPTION OF DRAWINGS

FIG. 3 is a diagram showing vulnerability information according to the embodiment.

FIG. 5 is a diagram for describing triage levels according to the embodiment.

FIG. 6 is a diagram showing a display format on a display 21 of a user terminal 20 according to the embodiment.

DESCRIPTION OF EMBODIMENT

Figure 1:
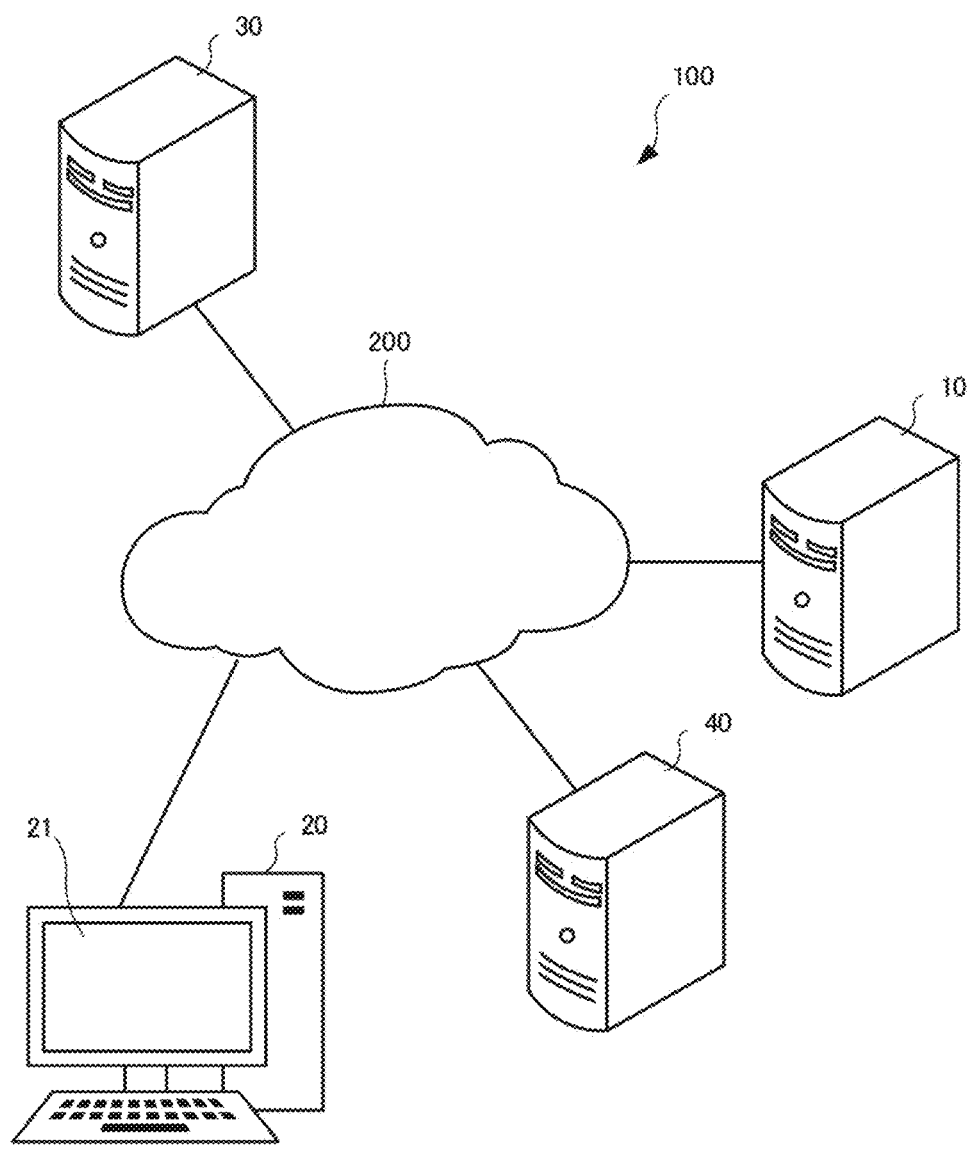
FIG. 1 is a diagram showing a processing system 100 according to an embodiment.

An embodiment will be described below with reference to the drawings. Throughout the drawings to be described below, like or similar elements are given like or similar symbols.

It is to be noted that the drawings are schematic and may be different from actual implementations, for example may not be drawn to scale. Specific dimensions should therefore be appropriately determined with reference to the following description. It is also to be understood that different drawings may include portions different in dimensional relationship or ratio.

[Overview of Disclosure]

A processing device according to an overview of the disclosure determines a vulnerability of open software in a system. The processing device includes a control unit that outputs priority of the vulnerability based on at least one of first information indicating whether the open software is externally accessible, and second information indicating whether an attack code for the vulnerability of the open software is in circulation. The control unit assigns higher priority to the vulnerability of the open software externally accessible compared to the vulnerability of the open software externally inaccessible, or assigns higher priority to the vulnerability where the attack code is in circulation compared to the vulnerability where the attack code is not in circulation.

In the overview of the disclosure, the processing device assigns higher priority to the vulnerability of the open software externally accessible compared to the vulnerability of the open software externally inaccessible. Alternatively, the processing device assigns higher priority to the vulnerability where the attack code is in circulation compared to the vulnerability where the attack code is not in circulation. That is, for the vulnerability of the open software externally inaccessible, addressing urgency would be low, and therefore the processing device can determine that the vulnerability does not need to be immediately addressed even if the vulnerability may have a significant effect. The processing device can also make similar determination for the vulnerability where the attack code is not in circulation. Accordingly, the above configuration enables the assignment of the appropriate priority to be assigned as index for determining a handling of the open software having the vulnerability, assuming the countermeasure such as avoiding the use of the software or updating the software.

The open software here may be software with its source code publicized such that modification and redistribution of the software is permitted (hereafter referred to as open source software (OSS)). The publicizing, modification, and redistribution may be performed for free. The priority may be a priority for addressing vulnerability of respective open software (hereafter referred to as a triage level). The triage level may be considered as the addressing urgency of the vulnerability of respective open software.

Embodiment (Processing System)

A processing system according to an embodiment will be described below. FIG. 1 is a diagram showing a processing system 100 according to an embodiment.

As shown in FIG. 1, the processing system 100 includes a processing device 10, a user terminal 20, a system server 30, and a vulnerability database (DB) 40. The processing device 10, the user terminal 20, the system server 30, and the vulnerability DB 40 are interconnected over a network 200. The network 200 may be implemented as, although not limited to, the Internet network. The network 200 may include a local area network, a mobile communication network, or a virtual private network (VPN).

The processing device 10 determines the vulnerability of OSS in a system constructed in the system server 30. The processing device 10 may be implemented as two or more servers. The processing device 10 may at least partially be implemented by a cloud computing service. The details of the processing device 10 will be described below (see FIG. 2).

The user terminal 20, which includes a display 21, uses a vulnerability determination function (hereafter referred to as a triage function). The user terminal 20 may be a terminal that uses a system including OSS. For example, the user terminal 20 may be a personal computer, a smartphone, or a tablet terminal. The display 21 may be a liquid crystal panel display or an organic EL panel display, for example.

The system server 30 is a server in which systems that include OSS are constructed. The systems constructed in the system server 30 may also include software other than OSS. For example, the software other than OSS may be user-developed software. The system server 30 may be implemented as two or more servers. The system server 30 may at least partially be implemented by a cloud computing service. The systems that include OSS may include public systems open to the public over the network 200 such as the Internet, or private systems not open to the public over the network 200 such as the Internet. For example, public systems may include systems for announcing products, services, or employment information. Private systems may include systems used for accounting processing or finance processing.

The vulnerability DB 40 is a database that stores information on the vulnerability of the OSS (hereafter referred to as vulnerability information). The vulnerability DB 40 may be a database that collects the vulnerability information from one or more databases by periodically crawling the databases. The one or more databases may include one or more databases selected from the Common Vulnerabilities and Exposures (CVE), IPA Cyber security Alert Service (ICAT) Metabase, National Vulnerability Database (NVD), Japan Vulnerability Notes (JVN), JVN iPedia, and Open Source Vulnerability Database (OSVDB).

(Processing Device)

Figure 2:
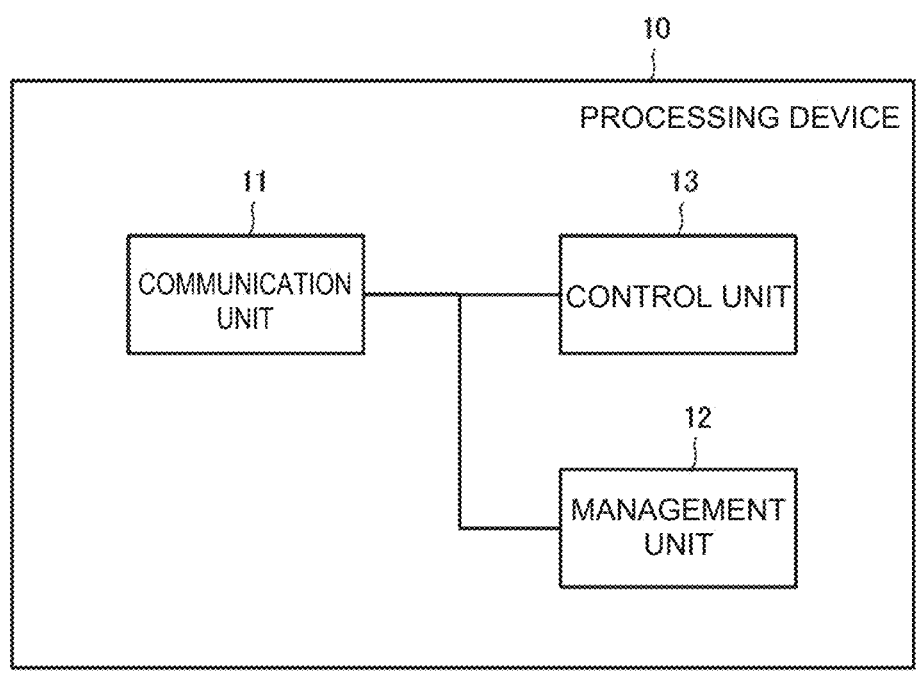
FIG. 2 is a diagram showing a processing device 10 according to the embodiment.

The processing device according to the embodiment will be described below. FIG. 2 is a diagram showing the processing device 10 according to the embodiment.

As shown in FIG. 2, the processing device 10 includes a communication unit 11, a management unit 12, and a control unit 13.

The communication unit 11 is implemented as a communication module. The communication module may be a wireless communication module conforming to a standard such as IEEE 802.11a/b/g/n, LTE, or 5G, or a wired communication module conforming to a standard such as IEEE 802.3.

The communication unit 11 may communicate with the user terminal 20 to provide the triage function to the user terminal 20. The communication unit 11 may communicate with the system server 30 to obtain information on software in the system constructed in the system server 30. The communication unit 11 may communicate with the vulnerability DB 40 to obtain the vulnerability information.

For example, the vulnerability information may include fourth information indicating a level of the vulnerability set by a third-party organization. The fourth information may be, for example, a score value (e.g., the Base Score) defined in the Common Vulnerability Scoring System (CVSS). The fourth information may include the version of CVSS. Further, if an attack code for a vulnerability of the OSS is in circulation, the vulnerability information may include the indication of the attack code for the vulnerability of the OSS.

The management unit 12, which is implemented as memory such as nonvolatile memory and/or as a storage medium such as a hard disk drive (HDD), stores various sorts of information.

The management unit 12 manages (stores) the vulnerability information obtained from the vulnerability DB 40. The vulnerability information managed by the management unit 12 may be information processed based on the vulnerability information obtained from the vulnerability DB 40. The processing may be adding, to the vulnerability information, third information (hereafter also referred to as the type) indicating a type of the vulnerability. The processing may be manually adding the type by an engineer, or automatically adding the type by, e.g., text analysis.

For example, the management unit 12 manages information shown in FIG. 3. VULNERABILITY is identification information on respective vulnerability of the OSS. OSS is identification information (e.g., the name) on respective OSS item in the system constructed in the system server 30. TYPE is information indicating the type of the vulnerability, as described above. DESCRIPTION is the description of respective vulnerability, and may include the version and the score value of CVSS. EFFECTS indicates expected effects of respective vulnerability, and may include the cause of the vulnerability, the manner of attack on the vulnerability, and the problem caused by the attack on the vulnerability.

The control unit 13 may include at least one processor. The at least one processor may be implemented as a single integrated circuit (IC) or as multiple circuits (such as integrated circuits and/or discrete circuits) communicatively interconnected.

The control unit 13 outputs the triage level of respective vulnerability based on at least one of first information indicating whether the OSS is externally accessible, and second information indicating whether the attack code for the vulnerability of the OSS is in circulation.

Specifically, the control unit 13 assigns the triage level of the vulnerability of the OSS externally accessible (externally accessible OSS) to a level higher than the triage level of the vulnerability of the OSS externally inaccessible (externally inaccessible OSS). Alternatively, the control unit 13 assigns the triage level of the vulnerability where the attack code is in circulation to a level higher than the triage level of the vulnerability where the attack code is not in circulation.

The control unit 13 may configure an output unit that outputs a user interface used to input whether the OSS is externally accessible. The control unit 13 may also output a user interface used to input whether the OSS is externally accessible per system including the OSS having the vulnerability. The user interface is transmitted from the communication unit 11 to the user terminal 20. The user interface may be displayed on the display 21 of the user terminal 20.

Figure 4:
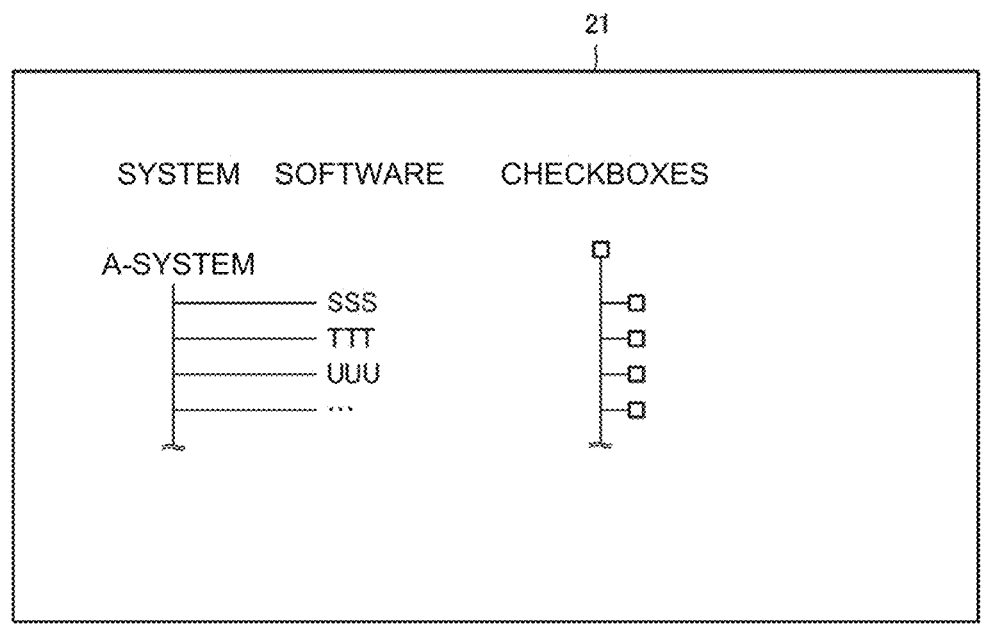
FIG. 4 is a diagram showing a user interface according to the embodiment.

An example of the user interface displayed on the display 21 is shown in FIG. 4. As shown in FIG. 4, the user interface includes identification information (A-SYSTEM in FIG. 4) on the system that includes the software, and identification information (SSS, TTT, and UUU in FIG. 4) on the software in the system. The user interface further includes checkboxes for inputting external accessibility.

In this interface, checking the checkbox on the right of A-SYSTEM may automatically cause the checkboxes on the right of all the software items in the system to be checked. Similarly, unchecking the checkbox on the right of A-SYSTEM may automatically cause the checkboxes on the right of all the software items in the system to be unchecked. That is, the external accessibility can be input per system including the OSS. Note that, the checkboxes on the right of the software items may be individually checked. Similarly, the checkboxes on the right of the software items may be individually unchecked.

In the example shown in FIG. 4, SYSTEM means the system constructed in the system server 30, and SOFTWARE in the system includes at least one OSS item.

As described above, the control unit 13 can obtain the first information based on the information input through the user interface (whether the checkboxes are checked or unchecked). Meanwhile, the control unit 13 can obtain the second information based on whether the vulnerability information includes the indication of the attack code.

In the embodiment, the control unit 13 may output the triage level of respective vulnerability based on both the first information and the second information. The control unit 13 may output the triage level of respective vulnerability based on the third information indicating the type of the vulnerability, in addition to the first information and the second information. Because the third information is added to the vulnerability information managed by the management unit 12, the control unit 13 can obtain the third information from the vulnerability information. The control unit 13 may output the triage level of respective vulnerability based on the fourth information indicating the level of the vulnerability set by the third-party organization, in addition to the first information, the second information, and the third information. Because the fourth information is included in the vulnerability information obtained from the vulnerability DB 40, the control unit 13 can obtain the fourth information from the vulnerability information.

The manner of outputting (determining) the triage level according to the above will be described with reference to FIG. 5. In FIG. 5, "○" means that the corresponding condition is met, whereas "-" means that the corresponding condition is not met.

First, the control unit 13 may identify the vulnerability that meets a fourth condition based on the fourth information, and may output the triage level of the vulnerability for identified vulnerability based on the first information, the second information, and the third information. The fourth condition is that the level of the vulnerability meets a level condition. For example, if the fourth information is the Base Score of CVSS, the fourth condition is that the Base Score is higher than a predetermined threshold. For the vulnerability that does not meet the fourth condition, the control unit 13 may omit the determination of the triage level based on the first information, the second information, and the third information. As shown in FIG. 5, for the vulnerability that does not meet the fourth condition, the control unit 13 may output the lowest triage level (e.g., Level 4). Level 4 may be a level having no necessity to be addressed in particular.

Second, the control unit 13 may identify the vulnerability that meets a second condition based on the second information, and may output the triage level of the vulnerability for identified vulnerability based on the first information. The second condition is that the attack code is in circulation. For the vulnerability that does not meet the second condition, the control unit 13 may omit the determination of the triage level based on the first information. As shown in FIG. 5, for a vulnerability that does not meet the second condition, the control unit 13 may output the second lowest triage level (e.g., Level 3). Level 3 is a level having a greater necessity to be addressed than Level 4.

Third, the control unit 13 may identify the vulnerability that meets a third condition based on the third information, and may output the triage level of the vulnerability for identified vulnerability based on the first information. The third condition is that the type of the vulnerability meets a type condition. The type condition may be the type managed by the management unit 12 as the vulnerability information, as described above. Alternatively, the type condition may be the type managed by the management unit 12 as a predetermined type. The predetermined type is a type having a relatively great necessity to be addressed. For the vulnerability that does not meet the third condition, the control unit 13 may omit the determination of the triage level based on the first information. As shown in FIG. 5, for the vulnerability that does not meet the third condition, the control unit 13 may output the second lowest triage level (e.g., Level 3). Level 3 is a level having a greater necessity to be addressed than Level 4.

Here, the control unit 13 outputs Level 3 as the triage level of the vulnerability that meets neither the second condition nor the third condition. However, embodiments are not limited to this. The control unit 13 may output Level 3 as the triage level of the vulnerability that meets only one of the second condition and the third condition. Similarly, the control unit 13 outputs, based on the first information, the triage level of the vulnerability that meets at least one of the second condition and the third condition. However, embodiments are not limited to this. The control unit 13 may output, based on the first information, the triage level of the vulnerability that meets both the second condition and the third condition.

Fourth, the control unit 13 may determine, based on the first information, whether each vulnerability that meets at least one of the second condition and the third condition meets a first condition. The first condition is that the OSS having the vulnerability or the system including the OSS having the vulnerability is externally accessible. As shown in FIG. 5, for the vulnerability that meets the first condition, the control unit 13 outputs the highest triage level (e.g., Level 1). For the vulnerability that does not meet the first condition, the control unit 13 outputs the second highest triage level (e.g., Level 2). Level 2 is a level having a greater necessity to be addressed than Level 3. Level 1 is a level having a greater necessity to be addressed than Level 2.

(Display Format)

A display format according to the embodiment will be described below. FIG. 6 is a diagram showing a display format on the display 21 of the user terminal 20 according to the embodiment. The display format shown in FIG. 6 is a mere example, and other display formats may be adopted on the display 21.

As shown in FIG. 6, the display 21 displays a list of vulnerabilities as the triage function. ID is identification information assigned to each vulnerability. TRIAGE LEVEL is information indicating the priority in addressing the vulnerability. STATUS is information indicating whether each vulnerability has been addressed. REPOSITORY is information indicating the location in the system server 30 where each corresponding software item is stored. SOFTWARE is identification information on each corresponding software item. SCAN DATE is information indicating the date and time at which each vulnerability was discovered by scanning.

(Processing Method)

Figure 7:
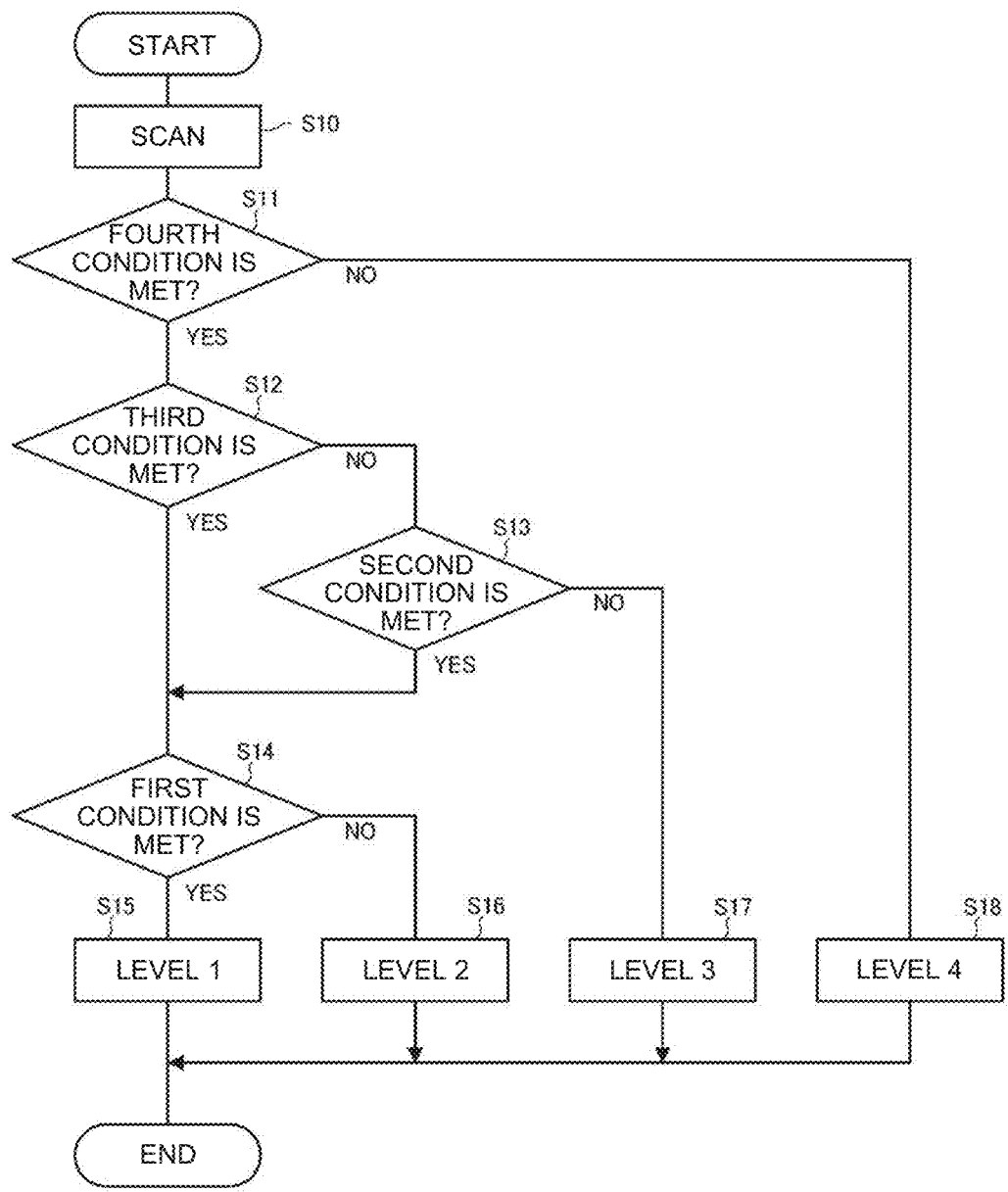
FIG. 7 is a diagram showing a processing method according to the embodiment.

A processing method according to the embodiment will be described below. FIG. 7 is a diagram showing a processing method according to the embodiment.

At step S10, the processing device 10 scans the OSS in the system constructed in the system server 30. In detail, the processing device 10 scans the vulnerability of the OSS based on the vulnerability information managed by the management unit 12.

At step S11, for each vulnerability discovered at step S10, the processing device 10 determines whether the fourth condition is met. The details of the fourth condition have been described above. If the fourth condition is met, processing at step S12 is performed. If the fourth condition is not met, processing at step S18 is performed.

At step S12, for each vulnerability that meets the fourth condition, the processing device 10 determines whether the third condition is met. The details of the third condition have been described above. If the third condition is met, processing at step S14 is performed. If the third condition is not met, processing at step S13 is performed.

At step S13, for each vulnerability that meets the fourth condition, the processing device 10 determines whether the second condition is met. The details of the second condition have been described above. If the second condition is met, processing at step S14 is performed. If the second condition is not met, processing at step S17 is performed.

At step S14, for each vulnerability that meets either one of the second condition and the third condition, the processing device 10 determines whether the first condition is met. The details of the first condition have been described above. If the first condition is met, processing at step S15 is performed. If the first condition is not met, processing at step S16 is performed.

At step S15, the processing device 10 determines the triage level of the vulnerability to be Level 1. The details of Level 1 have been described above.

At step S16, the processing device 10 determines the triage level of the vulnerability to be Level 2. The details of Level 2 have been described above.

At step S17, the processing device 10 determines the triage level of the vulnerability to be Level 3. The details of Level 3 have been described above.

At step S18, the processing device 10 determines the triage level of the vulnerability to be Level 4. The details of Level 4 have been described above.

The processing from step S11 to step S18 is performed for all the vulnerabilities discovered at step S10. The order of step S12 and step S13 may be reversed.

Effects and Advantages

In the embodiment, the processing device 10 assigns higher triage level of the vulnerability of externally accessible OSS compared to the vulnerability of externally inaccessible OSS. Alternatively, the processing device 10 assigns higher triage level of the vulnerability where the attack code is in circulation compared to the triage level of the vulnerability where the attack code is not in circulation. That is, for the vulnerability of externally inaccessible OSS, addressing urgency would be low, and therefore the processing device 10 can determine that the vulnerability does not need to be immediately addressed even if the vulnerability may have a significant effect. The processing device 10 can also make similar determination for the vulnerability where the attack code is not in circulation. Accordingly, the above configuration enables the assignment of the appropriate triage levels to be assigned as indexes for determining the handling of the OSS having the vulnerability, assuming the countermeasure such as avoiding the use of the OSS or updating the OSS.

In the embodiment, the processing device 10 may output the user interface used to input whether the OSS is externally accessible. This configuration enables the processing device 10 to obtain the first information in the simple manner. Further, the user interface may be used to input whether the OSS is externally accessible per system including the OSS having the vulnerability. This configuration can simplify user input.

In the embodiment, the processing device 10 may identify, based on the fourth information, each vulnerability that meets the fourth condition, and then output, based on the first information, the second information, and the third information, the triage level of the vulnerability identified. This configuration enables omitting the determination based on the first information, the second information, and the third information for vulnerabilities that do not meet the fourth condition, thereby reducing the processing load on the processing device 10.

In the embodiment, the processing device 10 may determine, based on the first information, whether each vulnerability that meets at least one of the second condition and the third condition meets the first condition. This configuration enables omitting the determination based on the first information for vulnerabilities that meet neither the second condition nor the third condition, thereby reducing the processing load on the processing device 10.

Other Embodiments

While the present invention has been described with respect to the above embodiment, the description and the drawings that form part of this disclosure should not be construed as limiting the present invention. Various alternative embodiments, implementations, and operational techniques will become apparent to those skilled in the art from this disclosure.

The embodiment has illustrated the four triage levels. However, embodiments are not limited to this. The number of triage levels may be five or more, or may be three or less.

The embodiment has illustrated the second condition and the third condition that are the same in their importance. However, embodiments are not limited to this. The second condition may have higher importance than the third condition. In this case, the triage level of the vulnerability that meets the second condition may be higher than the triage level of the vulnerability that meets the third condition. Similarly, the third condition may have higher importance than the second condition. In this case, the triage level of the vulnerability that meets the third condition may be higher than the triage level of the vulnerability that meets the second condition.

The embodiment has illustrated outputting the user interface used to input whether the OSS is externally accessible. However, embodiments are not limited to this. The processing device 10 may automatically determine whether the OSS is externally accessible by learning the system constructed in the system server 30 (e.g., by deep learning). Further, the user interface may include, as default values, the result of this automatic determination.

The embodiment has illustrated the processing device 10 as a single device. However, embodiments are not limited to this. The functions of the processing device 10 may be implemented by two or more entities. The two or more entities may include entities that provide a cloud computing service. The management unit 12 may be a database provided on a cloud separately from the processing device 10.

Although not particularly mentioned in the embodiment, a program that causes a computer to perform the processing to be performed by the processing device 10 may be provided. The program may be recorded on a computer-readable medium. The computer-readable medium can be used to install the program to the computer. The computer-readable medium having the program recorded thereon may be a non-transitory recording medium. The non-transitory recording medium may be, although not limited to, a recording medium such as a CD-ROM or a DVD-ROM, for example.

Alternatively, a chip may be provided, the chip including: memory that stores a program for performing the processing to be performed by the processing device 10; and a processor that executes the program stored in the memory.

The content of Patent Application No. 2019-99506 (filed on May 28, 2019) is incorporated herein by reference in its entirety.

REFERENCE SIGNS LIST

10 Processing Device
11 Communication Unit
12 Management Unit
13 Control Unit
20 User Terminal
21 Display
30 System Server
40 Vulnerability db
100 Processing System

The invention claimed is:

1. A processing device comprising:
a memory; and
a processor that, when executing a program stored in the memory;
outputs a user interface to enable a user to input whether the open software is externally accessible when detecting that a system including open software has a vulnerability; and
determines, in response to the input, a priority of the vulnerability of the open software based on first information indicating whether the open software is externally accessible, and second information indicating whether an attack code for the vulnerability of the open software is in circulation, wherein
the processor assigns higher priority to the vulnerability of the open software externally accessible compared to the vulnerability of the open software externally inaccessible, and assigns higher priority to the vulnerability of the open software where the attack code is in circulation compared to the vulnerability of the open software where the attack code is not in circulation.

2. The processing device according to claim 1, wherein the processor outputs the priority of the vulnerability of the open software based on both the first information and the second information.

3. The processing device according to claim 2, wherein the processor outputs the priority of the vulnerability of the open software based on third information indicating a type of the vulnerability of the open software, in addition to the first information and the second information.

4. The processing device according to claim 3, wherein the processor outputs the priority of the vulnerability of the open software based on fourth information indicating a level of the vulnerability of the open software set by a third-party organization, in addition to the first information, the second information, and the third information.

5. The processing device according to claim 4, wherein
the processor identifies that the vulnerability of the open software having the level meets a level condition based on the fourth information, and
the processor outputs the priority of the vulnerability of the open software for an identified vulnerability, based on the first information, the second information, and the third information.

6. The processing device according to claim 3, wherein
the processor identifies that the vulnerability of the open software has the attack code in circulation based on the second information, or identifies that the vulnerability of the open software has the type that meets a type condition based on the third information, and
the processor outputs the priority of the vulnerability of the open software for an identified vulnerability, based on the first information.

7. A processing method for determining a vulnerability of open software in a system, the method comprising the steps of:

outputting a user interface used to input whether the open software is externally accessible per system including the open software, and receiving first information indicating whether the open software is externally accessible from the user interface;

in response to the input, determining priority of the vulnerability of the open software based on the first information and based on second information indicating whether an attack code for the vulnerability of the open software is in circulation; and assigning higher priority to the vulnerability of the open software externally accessible compared to the vulnerability of the open software externally inaccessible, and assigns higher priority to the vulnerability of the open software where the attack code is in circulation compared to the vulnerability of the open software where the attack code is not in circulation.

* * * * *